3,162,657
PRODUCTION OF ALPHA-SULFOALKANOIC ACIDS
Norman D. Gordon, Chicago, and Elliot N. Schubert, Skokie, Ill., assignors to Armour and Company, Chicago, Ill., a corporation of Delaware
No Drawing. Filed July 25, 1962, Ser. No. 212,447
7 Claims. (Cl. 260—400)

This invention relates to the production of alpha-sulfoalkanoic acids, and more particularly to an improved method for the production of alpha-sulfoalkanoic acids (alpha-sulfoalkyl) which are useful as surface-active agents and for other uses.

Previous sulfonation processes for the preparation of sulfonic acid derivatives of fatty acids have been too costly for the commercial manufacture of these products. Erratic and insufficient yields obtained by the prior processes are factors responsible for the higher costs, and the methods heretofore used for recovering the sulfonic acids from the reaction mixtures have contributed substantially to such costs.

Common methods for recovering the sulfonic acid derivatives from the reaction mixtures have been to cool the reaction mixtures to substantially below ambient temperatures in order to precipitate the sulfonic acid, or to neutralize the mixtures and thereby convert the sulfonic acid to insoluble metallic salts, or to use the aqueous salt solutions to wash the reaction mixtures to effect precipitation of the sulfonic derivatives as the half-salt. When the reaction mixtures are cooled to very low temperatures, there is considerable capital investment required for the refrigeration equipment as well as auxiliary equipment necessary to keep the processing system at the requisite low temperatures. If the sulfonic acid derivatives are neutralized in the reaction mixture to form metallic salts, the subsequent conversion of these salts to the free sulfonic acids is impossible when the free acids are desired for other uses.

A primary object of the invention is to provide a simple and economical process for the production of alpha-sulfoalkyl derivatives of fatty acids. A further object is to provide a process for recovering the sulfonic acids from the reaction mixtures in high yield and at extremely low cost. A further object is to provide a process for the production of sulfonated derivatives of fatty acids which may be carried out efficiently on a commercial scale. Other specific objects and advantages will appear as the specification proceeds.

In one embodiment of the invention, a fatty acid containing 8 to 22 carbon atoms is reacted under substantially anhydrous conditions with a strong sulfonating agent in the presence of an inert solvent, the sulfonating agent being added slowly so that during the major portion of addition there is substantially no excess of the sulfonating agent above that required by the stoichiometry of the reaction. The resultant reaction mixture is held to complete the sulfonation reaction and then cooled in the presence of a second inert liquid solvent to precipitate the alpha-sulfoalkanoic acid. The alpha-sulfoalkanoic acid may then be separated, dried, etc.

We prefer to carry on the sulfonation reaction under substantially anhydrous conditions to avoid the formation of undesirable side-reaction products.

The fatty acids susceptible to treatment in accordance with the principles of the present invention are the substantially saturated fatty acids having 8 to 22 (preferably 12 to 18) carbon atoms in their chain length. Preferably, the iodine value should be less than 1. Individual fatty acids, such as lauric acid, myristic acid, palmitic acid and stearic acid, may be used, or mixtures thereof obtained from natural sources, such as the animal and marine fats and oils, and vegetable oils. Examples of fats and oils from which the mixture of fatty acids may be obtained are tallow, lard, palm oil, coconut oil, soybean oil, and menhaden fish oil.

The use of a solvent as a medium for effecting the sulfonation reaction is desirable. The solvent promotes the intimate mixing of the reactants and dilutes the reaction mixture to moderate the effect of the sulfonating agent, thereby minimizing the formation of undesirable by-products. The reaction solvent should be inert and unreactive with the fatty acid, sulfur trioxide, and the alpha-sulfoalkanoic derivative under the conditions of the reaction. Preferably, it should be miscible with the fatty acid and the sulfur trioxide, but not miscible with the sulfonic acid derivative at filtration temperatures. Solvents that have been found satisfactory for use as the reaction medium for the sulfonation procedure of the present invention are halogenated hydrocarbons, such as tetrachloroethylene and carbon tetrachloride.

Any of the conventional sulfonating agents may be used in the process. However, sulfur trioxide is the preferred agent for it is the most economical and the easiest to work with. It may be added to the fatty acids either as a liquid or as a vapor diluted with an inert dry gas prior to introduction into the reaction vessel. Vigorous agitation of the reaction mixture is preferred to minimize local reaction between the reactants and formation of undesirable by-products.

In the sulfonation operation, we prefer to add the sulfonating agent slowly so that during the major portion of the addition period there is no excess of the sulfonating agent (sulfur trioxide) above that required by the stoichiometry of the reaction. For example, in initiating the operation, the fatty acid is first treated with less than the stoichiometric proportion of sulfur trioxide per mole of fatty acid, at a temperature ranging from room temperature to 180° F. Thereafter as the reaction proceeds, sulfur trioxide is added slowly, with the result that during the major part of the addition there is no excess of sulfur trioxide above that required by the stoichiometry of the reaction. For example, when fatty acid and sulfur trioxide are reacted in the ratio of from about 1.0 to about 1.2 moles of sulfur trioxide per mole of fatty acid, the slow charge is from about 0.2 to about 0.7 mole of sulfur trioxide per mole of fatty acid, and this may be continuously and slowly added to the fatty acid.

The precipitation of the dibasic alpha-sulfoalkanoic acid derivatives is effected in a very simple, novel and economical manner. Simple cooling of the reaction mixture in the presence of a second inert solvent precipitates the dibasic sulfonic acid at ambient temperatures of the coolant, thereby obviating the necessity for reducing the temperature of the mixture as low as previous processes required. Cold water having a water-main ambient temperature of about 40° to about 80° F., depending on the season of the year, is used as the coolant. The reduction of the temperature of the reaction mixture is effected by means of conventional cooling devices, such as cooling coils in batch type reactors or external heat exchangers.

The second solvent should be miscible and unreactive with the reaction or primary solvent, as well as being inert and non-reactive with the fatty acids, sulfur trioxide, and the alpha-sulfoalkanoic acid derivatives. It should solubilize any unreacted charging reactants or undesired by-products, but not the sulfonic acid derivatives. This secondary solvent may be admixed with the digested reaction mixture prior to cooling, or after a partial cooling thereof in amounts that range from about 25% to 100% of the reaction solvent. However, the ratio of secondary solvent to primary solvent is not critical. Since the secondary solvent effectively solubilizes the non-sulfonic acid materials present in the mixture and further reduces the viscosity thereof, it aids in the precipitation and separation of the alpha-sulfoalkanoic acid derivatives from the liquid environment.

We have found that petroleum ether solvents, which may include butane, pentane, hexane, are efficacious solvents for use in the precipitating step of the process. A commercial petroleum ether solvent available under the trade name "Skellysolve F" is particularly useful as the secondary solvent. The above are all hydrocarbon solvents.

The alpha-sulfoalkanoic acid derivatives are purified by washing the filter or centrifuge cake with fresh secondary solvent, such as those hereinbefore mentioned for use in the precipitation step, to remove the residual mother liquor.

After washing, the solid sulfonic acid derivative is dried to remove the trace amounts of solvent. Conventional means such as a vacuum drier may be used. Precautionary measures should, however, be taken to protect the dried sulfonic acid product, which is extremely hygroscopic, from coming in contact with moist air prior to packaging.

In the operation of the sulfonation process of the present invention, it is desirable to initiate cooling of the digested reaction mixture promptly upon completion of the digestion step. Prompt cooling minimizes the possible development of undesirable by-products.

The color of the sulfonated fatty acid derivatives prepared with the two-solvent system of the present invention is lighter than when a precipitating solvent is not used. In the examples which follow, the color of the product has been determined by the Gardner method for determining the color of organic materials. The dry sulfonic acid is dissolved in isopropanol to form a twenty percent solution which is then read on the Gardner color comparator.

In the foregoing process, the primary solvent, in which the reaction is run, is a solvent which is inert to $SO_3$. However, the secondary solvent, which is the solvent used to effect the precipitation of the sulfonic acid, need not be inert to $SO_3$, but should be inert to the sulfonic acid.

By the use of the secondary solvent in addition to the reaction solvent, effective precipitation of the alpha-sulfoalkanoic acids is brought about at ambient temperatures and it is no longer necessary to cool below ambient temperatures, with the resultant disadvantages and costs, while at the same time employing less sulfonating agent and obtaining an increased yield.

Specific examples illustrating embodiments of the invention may be set out as follows:

*Example I*

25 pounds of Neo-Fat 18S (commercial stearic acid) and 89 pounds of perchloroethylene (commercial tetrachloroethylene) were charged to an enclosed glass-lined reactor equipped with an agitator and heating and cooling coils. After heating to about 60° C. (140° F.), Sulfan B (commercial stabilized sulfur trioxide) was added slowly as a vapor (7 pounds diluted to 4.82% by volume with dry air over a period of one hour). The digestion was carried on for approximately one hour at a temperature of 60° C. (140° F.). The Sulfan B was added slowly so that there was no excess of Sulfan B above that required by the stoichiometry of the reaction. To the digested mixture was added 27 pounds of Skellysolve F, the mixture then cooled to about 60° F., and the precipitate was removed by filtration. The cake was washed with 216 pounds of fresh Skellysolve F and dried in a vacuum drier. A yield of 93% of alpha-sulfostearic acid having a Gardner color of 12 was obtained.

*Example II*

23.5 pounds of Neo-Fat 18S and 84 pounds of perchloroethylene were charged to a reactor, as described in Example I. The mixture was heated to 132° F., and approximately 6.5 pounds of Sulfan B were added slowly in a continuous reaction process during which the temperature rose to 140° F. The resultant reaction mixture was digested at 140–141° F. for 60 minutes. Throughout the major portion of the reaction period, the Sulfan B was added at such a rate that there was no excess of $SO_3$ above that required by the stoichiometry of the reaction. At the end of the digestion period, a reduction in temperature was immediately initiated by circulating cold water through the cooling coils, and when the temperature had been reduced to 108° F., 27 pounds of Skellysolve F were added to the mixture and cooling continued with an intermediate holding period of one hour at 65° F. to 45° F., ambient temperature of the cold water. The solid alpha-sulfostearic acid precipitated during the cooling of the reaction mixture was separated by filtering the liquid mixture through a plate and frame filter process. The filter cake was washed with 216 pounds of fresh Skellysolve F to remove the residual mother liquor and dried in a vacuum drier. A yield of 93.3% of alpha-sulfostearic acid having a Gardner color of 12 was obtained.

*Example III*

140.0 grams of Neo-Fat 18S and 500 grams of perchloroethylene were charged into a three-necked round bottom flask equipped with an inlet tube, sparger, mechanical stirrer, thermometer, and Dry-Ice condenser. The mixture was heated to 110° F., and 44.0 ml. of Sulfan B were continuously added thereto as a vapor diluted to 5.0% by volume with dry nitrogen over a period of 45 minutes, the Sulfan B being added slowly at a rate less than the stoichiometric requirements. The resultant reaction mixture was digested at 137–142° F. for one hour. At the end of the digestion period, the mixture was cooled to 112° F., and 200 grams of Skellysolve F added thereto. The mixture was then cooled to 61° F. The precipitate was removed by filtration, washed with 550 grams of fresh Skellysolve F, and dried in a vacuum drier. A yield of 92.8% of alpha-sulfostearic acid having a Gardner color of 18 was obtained.

*Example IV*

The process was carried on as described in Example II except that 27 pounds of hexane were added to the digested mixture, which was immediately cooled to 45° F., the precipitate removed by filtration, and finally dried in a vacuum drier.

*Example V*

The process was carried on as described in Example I except that the Skellysolve F was added to the mixture at the end of the digestion period and a reduction in temperature was immediately initiated, the mixture being cooled to 60° F., held for two hours, and then passed through a filter to remove the precipitate. The filter cake was washed with fresh Skellysolve F, dried in a vacuum drier, and a yield of 95.7% of alpha-sulfostearic acid having a Gardner color of 16 was obtained.

*Example VI*

25.0 pounds of Neo-Fat 18S were charged to the reactor along with 89 pounds of perchloroethylene. After heating the mixture to 110° F., an initial charge of 3.5 pounds of Sulfan B was added slowly thereto as a vapor diluted to 4.82% by volume with dry air over a period of 45 minutes with the temperature rising to 126° F. An additional 3.5 pounds of Sulfan B were added continuously and slowly over an additional 30-minute period with the temperature rising to 145° F. The resultant reaction mixture was digested by holding it at 145° F. for one hour. The mixture was then immediately cooled to 110° F. and 27 pounds of Skellysolve F added with further cooling to bring the temperature of the mixture down to 65° F. The precipitate was then removed by filtration, the cake washed with 216 pounds of fresh Skellysolve F and dried in a vacuum drier. A yield of 85.9% of alpha-sulfostearic acid having a Gardner color of 15 was obtained.

*Example VII*

In a series of tests corresponding to the process described in Example II, the average yield of alpha-sulfostearic acid was 89.4%, with a high of 95.7% and a low of 84.7%, and the average Gardner color was 16.

*Example VIII*

The process was carried on as described in Example II except that the reaction solvent was carbon tetrachloride. Comparable results were obtained.

*Example IX*

The process was carried on as described in Example II except that the secondary solvent was butane. Results comparable to those set out in Example II were obtained.

*Example X*

Tests were carried on as described in Example II except that Neo-Fat 16 (commercially pure palmitic acid) and ethylene dichloride were used. A yield of 77.8% was obtained. A similar test in which Neo-Fat 12 (commercially pure lauric acid) together with perchloroethylene were charged to the reactor with a yield of 80.3% and a Gardner color of 16.

*Example XI*

892 lbs. perchlorethylene and 250 lbs. flaked Neo-Fat 18 were charged to a 150 gal., glass-lined Pfaudler reactor equipped with a reflux condenser, a jacket for either heating or cooling and an anchor type agitator with a vertical glass baffle. The flaked fatty acid was melted and solution effected at 120° F. Sulfur trioxide diluted to 5% by volume with dry air was introduced at a rate of approximately 0.2 lb. per minute, over a six-hour period, until a total of 74.5 lbs. had been added. During the course of the sulfur trioxide addition, the reaction temperature was allowed to rise from the initial temperature of 120° F. to 142° F., at the end of the addition by controlled cooling using city water at 55° F. in the jacket of the reactor. Perchlorethylene reflux was returned to the reactor. At the completion of the sulfur trioxide addition, the reaction mass was allowed to digest at 142° F. with agitation for an additional one and one-half hours, after which cooling water was applied. 35 gals. of Skellysolve F were added to the reaction mass at 90° F. and the cooling continued to 75° F. This was held at 75° F. for another hour to nurture the crytallization process. The crystallized, sulfonated fatty acid was then filtered with a plate and frame filter washed with 200 gals. of Skellysolve F and vacuum dried. Yield of sulfonated fatty acid was 80% with the following analysis:

| | |
|---|---|
| Total acid value | 309 |
| Sulfonic acid value | 158 |
| Carboxy acid value | 151 |
| Gardner Color (20%) | 11–12 |

While in the foregoing specification various embodiments of this invention have been set forth and many details thereof elaborated for the purpose of illustration, it will be apparent to those skilled in the art that this invenion is susceptible to other embodiments and that many of those details can be varied widely without departing from the basic concept and spirit of this invention.

We claim:

1. A process for the production of alpha-sulfoalkanoic acid, comprising heating and reacting under substantially anhydrous conditions a substantially saturated fatty acid containing 8 to 22 carbon atoms with a strong sulfonating agent in the presence of an inert chlorinated hydrocarbon liquid solvent by adding the sulfonating agent slowly so that during the major part of addition there is no excess of the sulfonating agent above that required by the stoichiometry of the reaction, said solvent being miscible with said fatty acid and sulfonating agent, holding the reaction mixture for a length of time sufficient to complete the sulfonation reaction, and cooling in the range of about 40° to 80° F. the reaction mixture containing the sulfonic acid product and byproducts in the presence of a second inert liquid hydrocarbon solvent, which is a solvent for said byproducts but not for said sulfonic acid product, to precipitate alpha-sulfoalkanoic acid.

2. The process of claim 1 in which the second solvent is low-boiling petroleum ether.

3. The process of claim 1 in which the fatty acid contains 12 to 18 carbon atoms.

4. The process of claim 1 in which the fatty acid is stearic acid.

5. The process of claim 1 in which the fatty acid is lauric acid.

6. The process of claim 1 in which the fatty acid is palmitic acid.

7. A process for the production of alpha-sulfoalkanoic acid, comprising heating and reacting under substantially anhydrous conditions a saturated fatty acid containing 12 to 18 carbon atoms with sulfur trioxide in the presence of an inert chlorinated hydrocarbon liquid solvent by adding the sulfur trioxide slowly so that during the major portion of addition there is no excess of sulfur trioxide above that required by the stoichiometry of the reaction, said solvent being miscible with said fatty acid and said sulfur trioxide, and cooling in the range of about 40° to 80° F. the reaction mixture containing the sulfonic acid product and unreacted charging reactants and byproducts in the presence of a second inert liquid hydrocarbon solvent, which is a solvent for such reactants and byproducts but not a solvent for said sulfonic acid product, to precipitate alpha-sulfoalkanoic acid.

References Cited in the file of this patent

UNITED STATES PATENTS 2,203,441     Oliver     June 4, 1940

OTHER REFERENCES

Weil et al.: J. Am. Chem. Soc., 75, 2526–2527 (1953).